(12) United States Patent
Hsieh et al.

(10) Patent No.: US 7,286,757 B1
(45) Date of Patent: Oct. 23, 2007

(54) OPTICAL PERFORMANCE MONITORING DEVICE

(75) Inventors: Yung-Chieh Hsieh, San Jose, CA (US); Chiayu Ai, Newark, CA (US)

(73) Assignee: Optoplex Corporation, Freemont, CA (US)

( * ) Notice: Subject to any disclaimer, the term of this patent is extended or adjusted under 35 U.S.C. 154(b) by 488 days.

(21) Appl. No.: 10/758,408

(22) Filed: Jan. 14, 2004

Related U.S. Application Data (60) Provisional application No. 60/440,116, filed on Jan. 14, 2003.

(51) Int. Cl.
H04B 10/08 (2006.01)
H04B 10/06 (2006.01)

(52) U.S. Cl. ............... 398/33; 398/208; 398/213

(58) Field of Classification Search ............ 398/26, 398/33, 202, 208, 213
See application file for complete search history.

(56) References Cited

U.S. PATENT DOCUMENTS 6,369,923 B1* 4/2002 Kuo et al. .............. 398/91
7,041,959 B1* 5/2006 Palme et al. ............ 250/225
2003/0152385 A1* 8/2003 Eldada et al. ........... 398/34
2004/0052522 A1* 3/2004 Fishteyn et al. ......... 398/29

* cited by examiner

Primary Examiner—Dalzid Singh
(74) Attorney, Agent, or Firm—Antonio R. Durando (57) ABSTRACT

A wavelength beam splitter (WBS) is combined with a conventional tunable filter to sequentially select different channels in a multi-channel communication system. The WBS is characterized by a periodic spectral response with period equal to the channel spacing of the ITU grid. Preferably, the WBS consists of an optical cavity with an optical path length that produces a free-spectral range substantially equal to the channel spacing of the ITU grid. The WBS is used to separate the signal in each channel passband from the noise in the corresponding channel stopband. This provides a signal and a noise output for each channel. A tunable filter is used to scan the channels of the ITU grid sequentially and provide output signals for a single channel at a time. Therefore, a much smaller frequency bandwidth needs to be measured at a time and a less expensive detector may be used.

25 Claims, 12 Drawing Sheets

OPTICAL PERFORMANCE MONITORING DEVICE

RELATED APPLICATIONS

This application is based on U.S. Provisional Ser. No. 60/440,116, filed Jan. 14, 2003.

BACKGROUND OF THE INVENTION

1. Field of the Invention

This invention pertains to the general field of optical communication networks and, in particular, to a device for monitoring the optical power, the wavelength and the optical signal-to-noise ratio of communication channels.

2. Description of the Prior Art

In optical communication systems, information is transmitted along the same optical path at different wavelengths $\lambda i$ of light (channels) produced by a plurality of lasers. The wavelength of the beam produced by each laser is selected to match the center wavelength of a channel in the so-called ITU (International Telecommunication Union) grid, which typically includes 40 to 80 channels with a corresponding spacing of 100 or 50 Ghz. In order to retrieve the information contained in a particular channel, the signal wavelengths have to be spectrally separated. Therefore, it is very important that each channel's signals be maintained at the desired frequency. In addition, the international standards set for the bit-error rate require that a high signal-to-noise ratio be maintained at all times.

Figure 1:
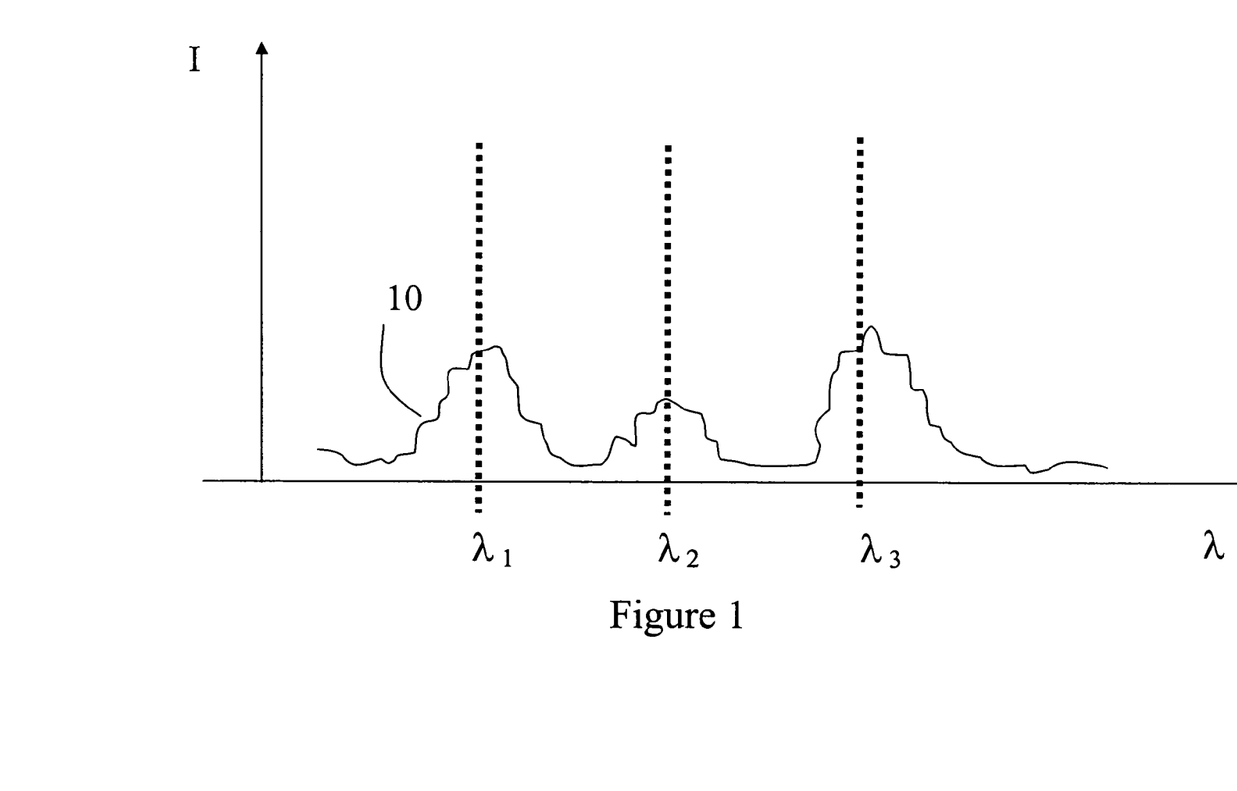
FIG. 1 illustrates the typical output signal of an ITU grid for a telecommunication system.

Thus, especially in view of the higher and higher channel densities used in communication networks, optical performance monitoring has become a necessity to ensure clarity of signal. This requires that the signal output and the noise output be separated and measured, and that the center wavelength of each channel's signal be monitored during transmission. As illustrated in FIG. 1, a multi-channel signal output is characterized by a spectrum that consists of a plurality of channels with carrier wavelengths around the ITU grid with background noise. The center wavelength of the signal in each channel ideally coincides with a corresponding ITU grid wavelength $\lambda i$ ($\lambda 1$-$\lambda n$), while the wavelengths between ITU channels (as determined by the passband of the channels) are characterized only by noise. Accordingly, current technology to measure noise is based primarily on the use of gratings that spread out the channels over a linear detector array. This permits individual pixels of the array to measure the intensity of the signal at different wavelengths, including noise detected at the wavelengths between channels. These inter-channel levels of noise are then interpolated between adjacent levels (or extrapolated from lower or higher frequencies only) according to convention to estimate the noise level at each channel. (See ANSI's TIA/EIA Standard OFSTP-19.)

This approach is undesirable because it requires the use of array detectors with very high resolution (such as InGaAs detectors), which are very expensive. Moreover, the detectors are necessarily not very accurate because very few pixels are available to detect the light within the narrow bands between channels (a typical 512-pixel detector in a 40-channel system provides only about 12 pixels for each channel to cover both signal and noise). Therefore, the grating-detector approach is not particularly efficient for telecommunication performance monitoring and any less expensive and more precise technology would be very desirable in the art.

SUMMARY OF THE INVENTION

This invention provides a novel approach to optical performance monitoring based on the use of a wavelength beam splitter with particular periodic spectral properties. In the preferred embodiment, the wavelength beam splitter is combined with a conventional tunable filter to sequentially select different channels for processing. According to one aspect of the invention, the wavelength beam splitter (WBS) is characterized by a periodic spectral response with period equal to the channel spacing of the communication system to be monitored. Preferably, the WBS consists of an optical cavity with an optical path length that produces a free-spectral range substantially equal to the channel spacing of the system to be monitored. The WBS is used to separate the signal in each channel passband from the noise in the corresponding channel stopband. This provides a signal and a noise output for each channel.

According to another aspect of the invention, a tunable filter is used to scan the channels of the ITU grid sequentially and provide output signals for a single channel at a time. Therefore, a less expensive detector may be used (such as a single element detector).

In other embodiments, the invention is carried out by combining the wavelength beam splitter with a switch and a conventional grating/detector assembly. The switch is used to pass either the signal or the noise channels to the grating, where the light is dispersed and captured by a detector array as in prior-art applications. Alternatively, a beam splitter may be used to produce two beams. The first beam is passed through the wavelength beam splitter and the resulting noise channels are fed to the switch. The second beam is passed directly to the switch from the beam splitter. The two beams are then processed alternately as determined by the position of the switch.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention is directed at providing an efficient and affordable device for monitoring the wavelength and the signal-to-noise ratio of a multi-channel communication system. The invention lies in a device that preferably consists of the combination of a tunable filter with a wavelength beam splitter.

As used in the art, "free-spectrum range" refers to the ration c/(2 l), where c is the speed of light and l is the optical length of a cavity. The output of a cavity is characterized by a periodic spectrum with a period determined by the optical-path length of the cavity. Accordingly, free-spectrum range also refers to the distance (measured in the frequency domain) between peaks in the spectrum of the output of the cavity.

Figure 2:
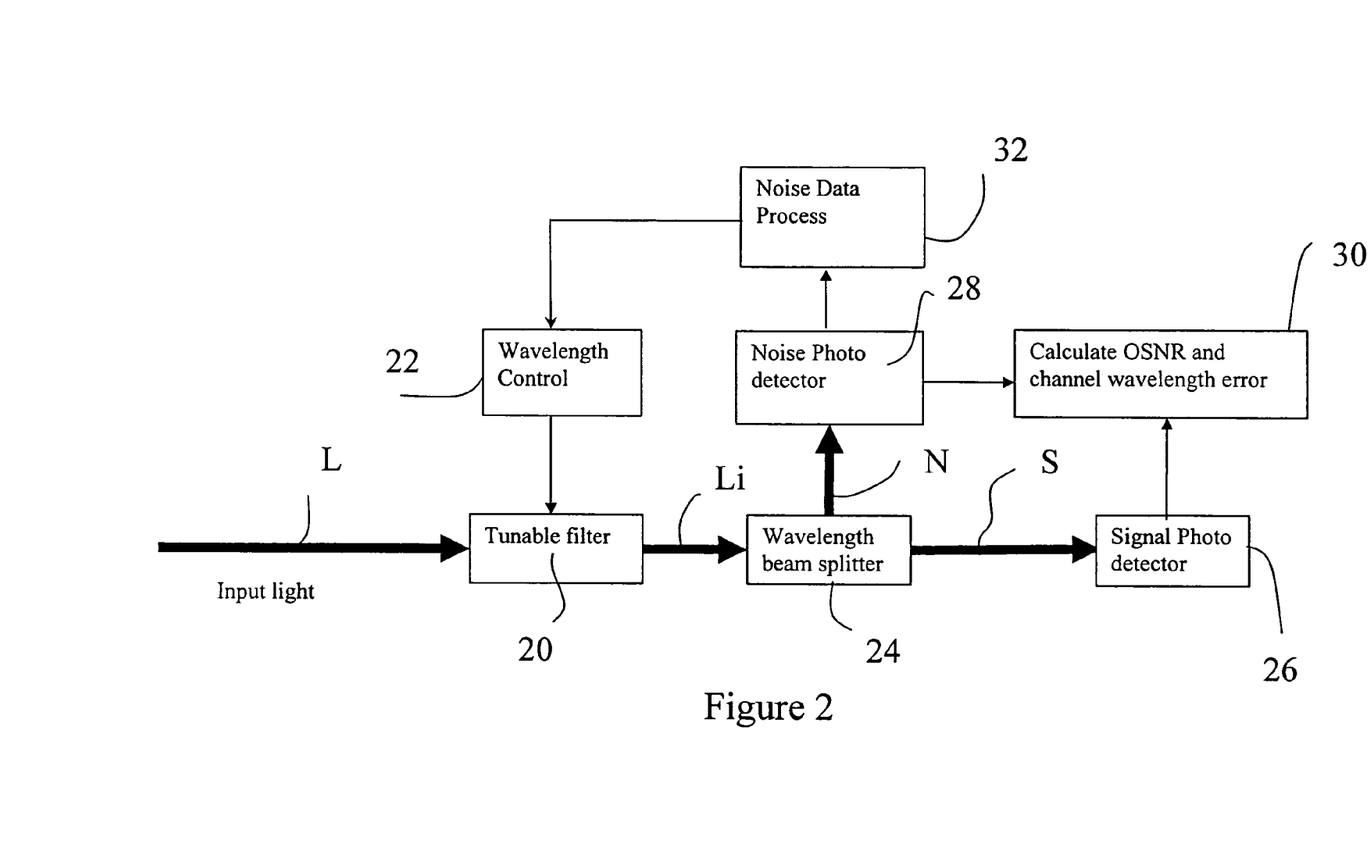
FIG. 2 is a schematic diagram of an optical performance monitoring system according to the invention.

Referring to the figures, wherein like parts are designated with like numerals and symbols, FIG. 2 illustrates schematically an optical performance monitoring system according to the invention. A multi-channel input light signal L produced by multiple lasers is fed to a conventional tunable filter 20 controlled by a wavelength controller 22 for the sequential transmission of each channel (Li, where i is used to indicate the channel or channels passed by the tunable filter 20) in the input beam while blocking all other channels. The transmitted channel Li is processed by a wavelength beam splitter 24 to produce a signal output Si and a separate noise output Ni. The signal and noise outputs Si,Ni are measured by respective detectors 26,28 and the signal-to-noise ratio is calculated by a processor 30. The signal output information is also used by the processor 30 to calculate the mean wavelength for the channel and compare it to the corresponding ITU grid wavelength for error calculation. The noise output information is also used in similar manner to find the ITU grid and this information is used to continuously calibrate the timing of the tunable filter 20 through the wavelength controller 22, as described in greater detail below.

Figure 3:
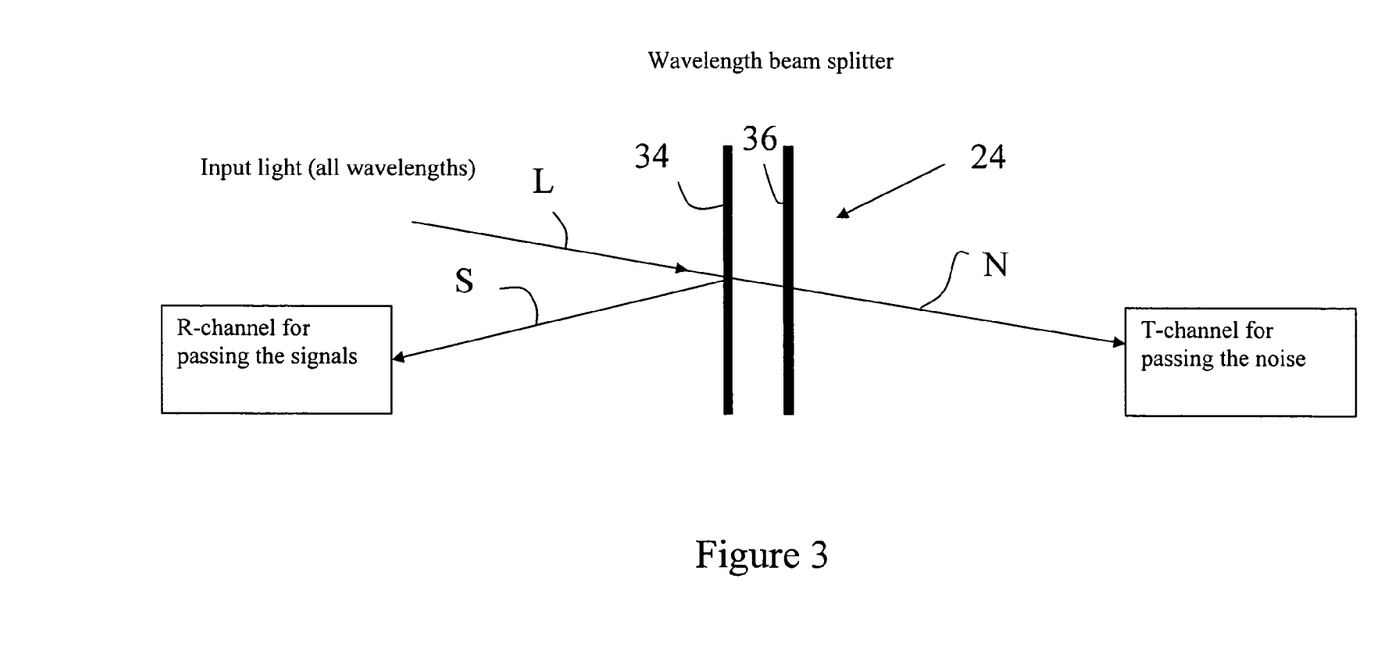
FIG. 3 is a schematic representation of an optical cavity as used to practice the invention.
Figures 4, 5:
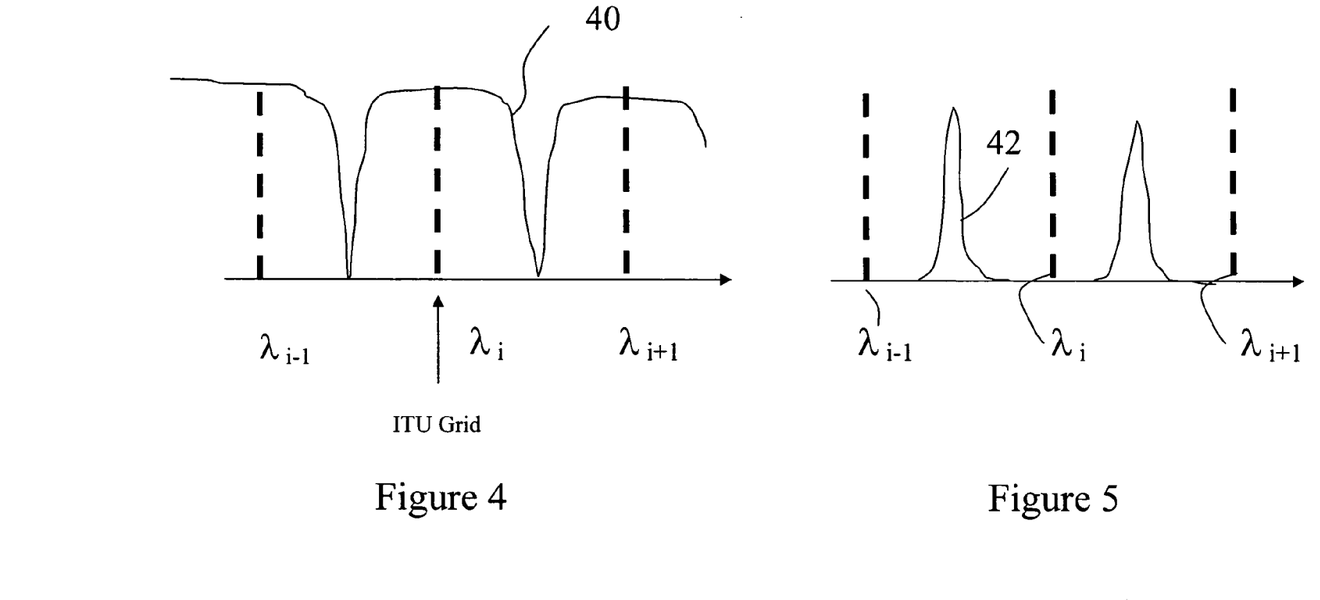
FIG. 4 illustrates the spectrum (light intensity as a function of frequency) of the reflection channel output of a conventional optical cavity, such as illustrated in FIG. 3.
FIG. 5 illustrates the spectrum (light intensity as a function of normalized frequency) of the transmission channel output of the optical cavity of FIG. 3.

Any conventional tunable filter 20 is suitable to practice the invention, so long as capable of passing a bandwidth commensurate with the channel spacing of the ITU grid. The filter 20 also needs to be controlled by a precise clock that permits the sequential passing of each channel in cyclical manner. The wavelength beam splitter (WBS) 24 needs to be characterized by a periodic spectral response with periodic center wavelengths selected to match the wavelengths half-way between the ITU grid, as shown in FIG. 5. Accordingly, the preferred embodiment of the WBS 24 consists of an optical cavity, as illustrated in FIG. 3.

As is well understood in the art, when a beam of light L impinges on a cavity, a portion of the light is reflected out of the cavity while another portion is transmitted through the cavity. Because of multi-reflection interference in the cavity, the reflected as well as the transmitted outputs have a periodic frequency spectrum with a period that depends on the optical length of the cavity. Moreover, fine adjustments to the optical length of the cavity can be used to align the center wavelength of each periodic signal in the transmitted output with the wavelength half-way between the ITU grid. The transmission bandwidth of a cavity is typically very narrow in relation to the reflection bandwidth and, as those skilled in the art will readily recognize, it can also be varied by appropriate adjustments to the reflectivity of each reflective surface 34,36 in the cavity. Therefore, these properties of cavities can be used advantageously to selectively reflect and transmit predetermined wavebands to separate signal from noise in the light of a multi-channel input beam. In particular, if the center frequencies are aligned as indicated above, the reflected beam will have a periodic spectrum corresponding to the passband frequencies of the channels in the ITU grid, while the transmitted beam will contain only the frequencies between channels.

For example, FIG. 4 illustrates the spectrum 40 of the reflection beam S (signal) in a cavity 24 with an optical length judiciously selected to produce a periodic frequency spectrum with a period that matches the channel spacing of a conventional ITU grid and is aligned with the center frequency λi of each channel. FIG. 5 similarly illustrates the spectrum 42 of the corresponding transmission beam N (noise). Since the light with wavelength outside the ITU channels is known to be produced only by noise, such as amplified spontaneous emission (ASE) noise, the transmission beam N provides a direct measure of the noise in the system at those wavelengths. This information is then interpolated or extrapolated in conventional manner to estimate the level of noise within the various communication channels. Accordingly, the wavelength beam splitter of the invention is used to separate the signal output S from the noise output N and to measure the intensity levels of the two light beams with separate detectors 26 and 28, as shown in FIG. 2. This information is then used to calculate the signal-to-noise ratio.

FIGS. 4 and 5 also illustrate how the information so derived from the invention can be used to monitor the frequency of the communication channels. From the spectrum illustrated in FIG. 4, for example, the center frequency for each channel can be calculated using any well known method, such as the center-of-gravity method. The frequency so calculated is then compared to the ITU grid for monitoring purposes, as explained in detail below.

Figure 6:
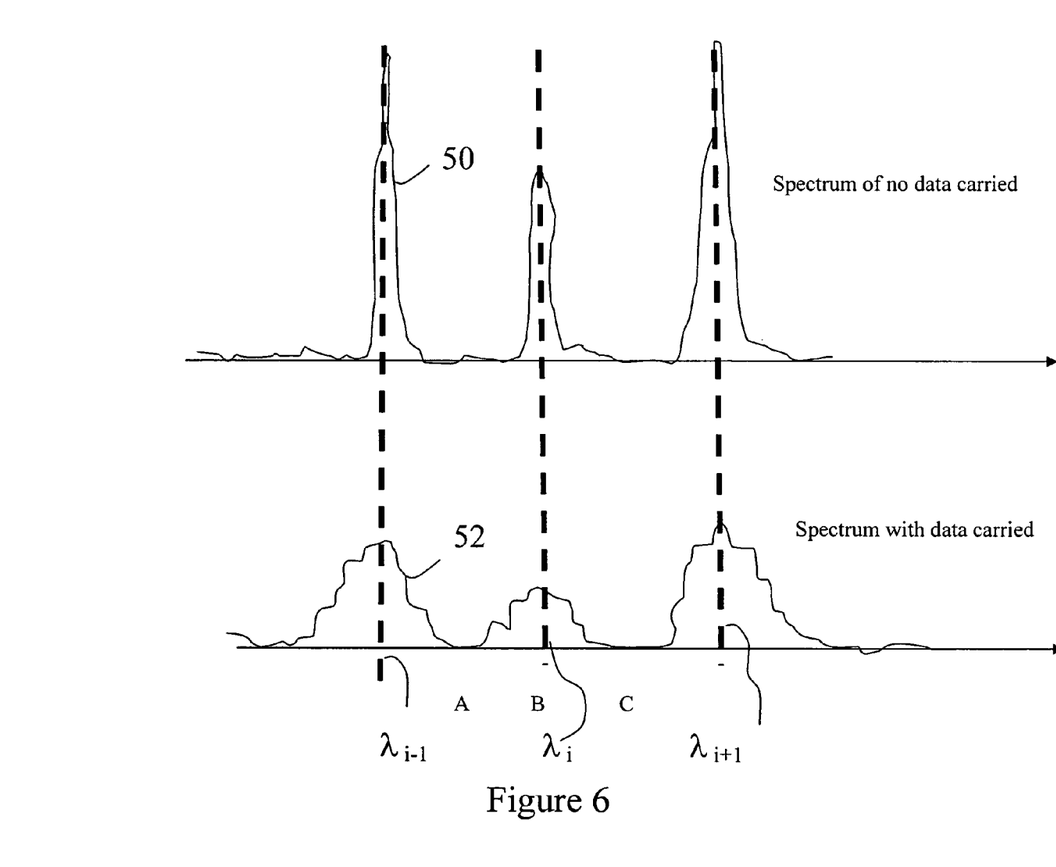
FIG. 6 illustrates the typical spectrum (light intensity as a function of normalized frequency) of the input light of a multi-channel telecommunication system with no data (above) and with data modulation (below).

FIG. 6 shows the typical spectrum of three consecutive channels in an optical fiber. The top plot 50 shows the light signal when no data are being communicated (that is, the laser signals are not modulated). The signal bandwidth for a typical laser is much less than 100 MHz (0.8 pm) around the center wavelength of each channel (the neighborhood of point B). The bottom plot 52 illustrates corresponding spectra when the signals are modulated. For a 10 Giga-bit/sec transmission system, the highest first harmonic is 5 GHz (40 pm), but taking into account all the significant harmonics the spectrum bandwidth can be as wide as 20 GHz (160 pm). Because of the modulation process used by convention coding, such as Non-Return to Zero, the integral of the modulated signal in each channel is about half that of the unmodulated laser signal.

Figure 7:
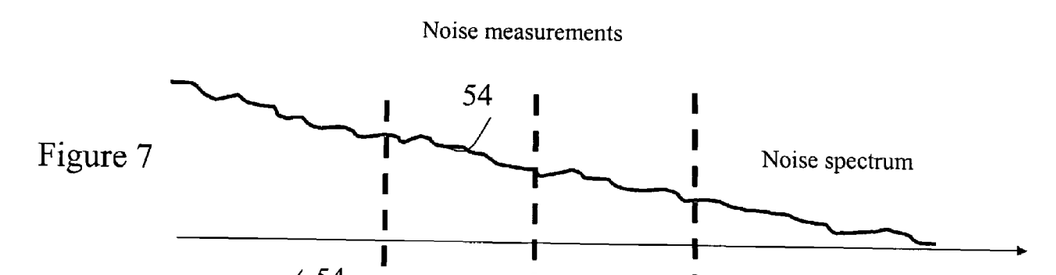
FIG. 7 illustrates the typical spectrum (light intensity as a function of normalized frequency) of the noise associated with a multi-channel communication system.
Figure 8:
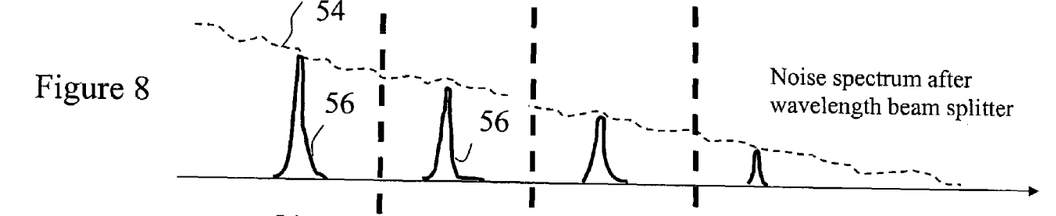
FIG. 8 illustrates the noise spectrum of FIG. 7 (light intensity as a function of normalized frequency) after passing through the wavelength beam splitter of the invention.
Figure 9:
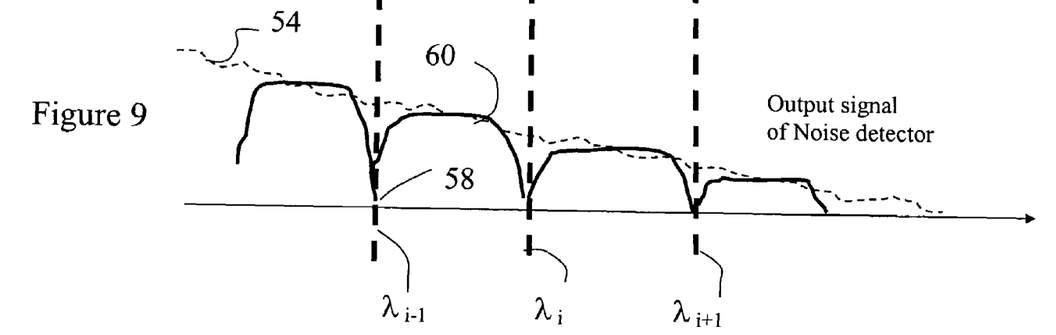
FIG. 9 illustrates the output signal (light intensity as a function of frequency) resulting from the convolution of the spectrum of FIG. 8 with the spectrum of a tunable filter according to the invention.
Figure 10:
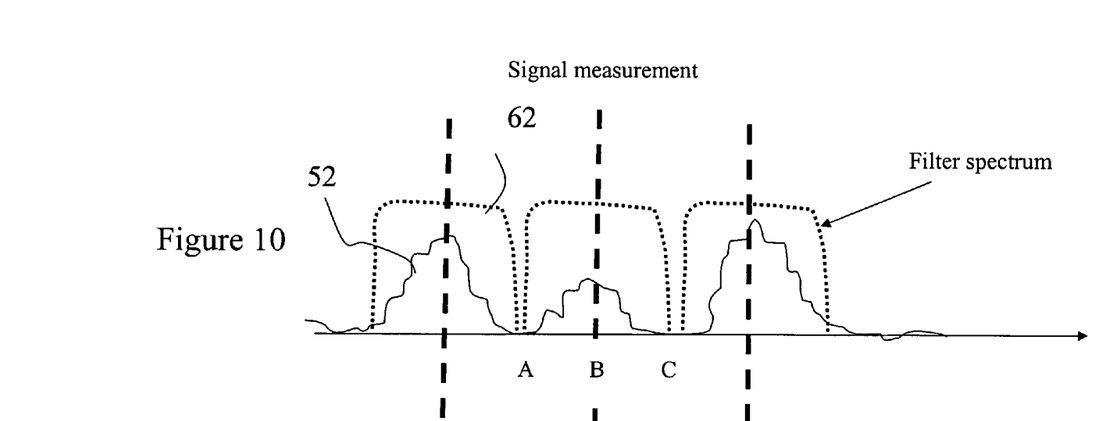
FIG. 10 illustrates the spectrum of a typical wavelength beam splitter superimposed over the modulated input spectrum of FIG. 6 (both in terms of intensity versus normalized frequency).
Figure 11:
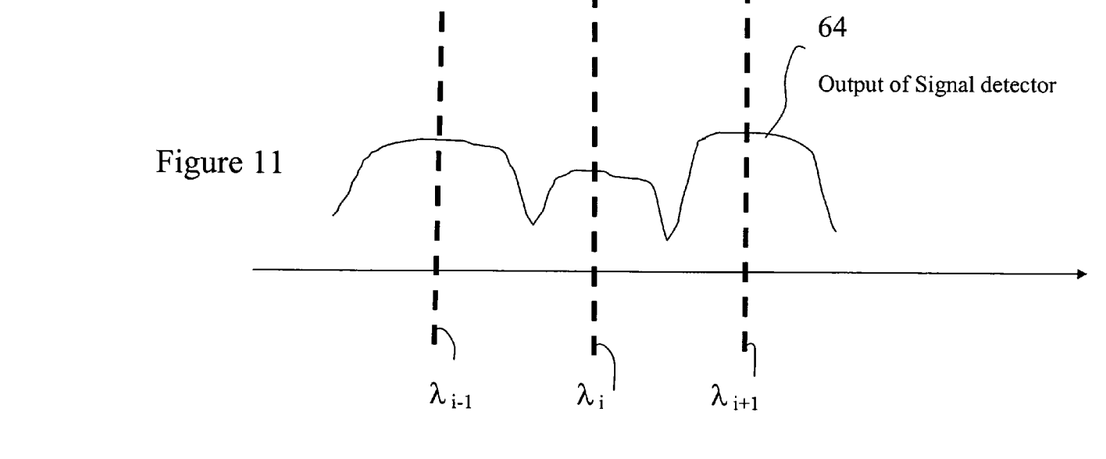
FIG. 11 illustrates the output signal (light intensity versus normalized frequency) resulting from the convolution of the modulated input spectrum of FIG. 10 with the spectrum of the tunable filter.

In order to measure optical signal-to-noise ratio, it is necessary to measure the levels of both the signal and the noise in the communication channels. As mentioned above, the signal levels can be measured in straightforward manner from the isolated signal channels, as indicated above. However, the noise levels have to be measured where there is no signal and extrapolated to the signal band. FIG. 7 illustrates the spectrum 54 of a typical noise that is mixed with the signal of communication channels. After passing through the wavelength beam splitter 24 of the invention, the noise spectrum is reduced to the periodic form 56 of FIG. 8. Since only noise light is transmitted between ITU channels to reach the noise detector 28, the noise level between channels is readily detected and measured. In fact, the output signal to the noise detector is characterized by a spectrum that is the convolution of the filtered noise spectrum with the spectrum of the filter, as would be readily understood by one skilled in the art. Such a spectrum is illustrated in FIG. 9, which also shows that the minima 58 of the noise output spectrum 60 correspond to the center wavelengths $\lambda i$ of the ITU channels. FIGS. 10 and 11 illustrate corresponding plots for the signal channels. The spectrum 52 (see also FIG. 6) of the input light is combined with the spectrum 62 of the tunable filter 20 and produces the output spectrum 64 of FIG. 11.

Thus, a simple and cost-effective method has been disclosed to measure signal-to-noise ratio and to monitor channel frequency in a multi-channel communication system. A tunable filter is used to scan the optical channel of the system and the filter's output is passed through a wavelength beam splitter with a free-spectral range substantially equal to the channel spacing of the communication system. The light with wavelength in the neighborhood of the signal channel is separated from the light with wavelength near the noise channel. By so doing, the signal light is prevented from reaching the noise detector and the accuracy of noise measurement is greatly enhanced.

It is noted that the photo-detector requirements for measuring the signal level are different from those for the noise level. Typically, the signal detector should have a dynamic range of about −20 dBm to 10 dBm, while the noise detector requires a range of about −10 dBm to −70 dBm. Therefore, the invention affords the additional advantage of permitting detection optimization.

Figure 12:
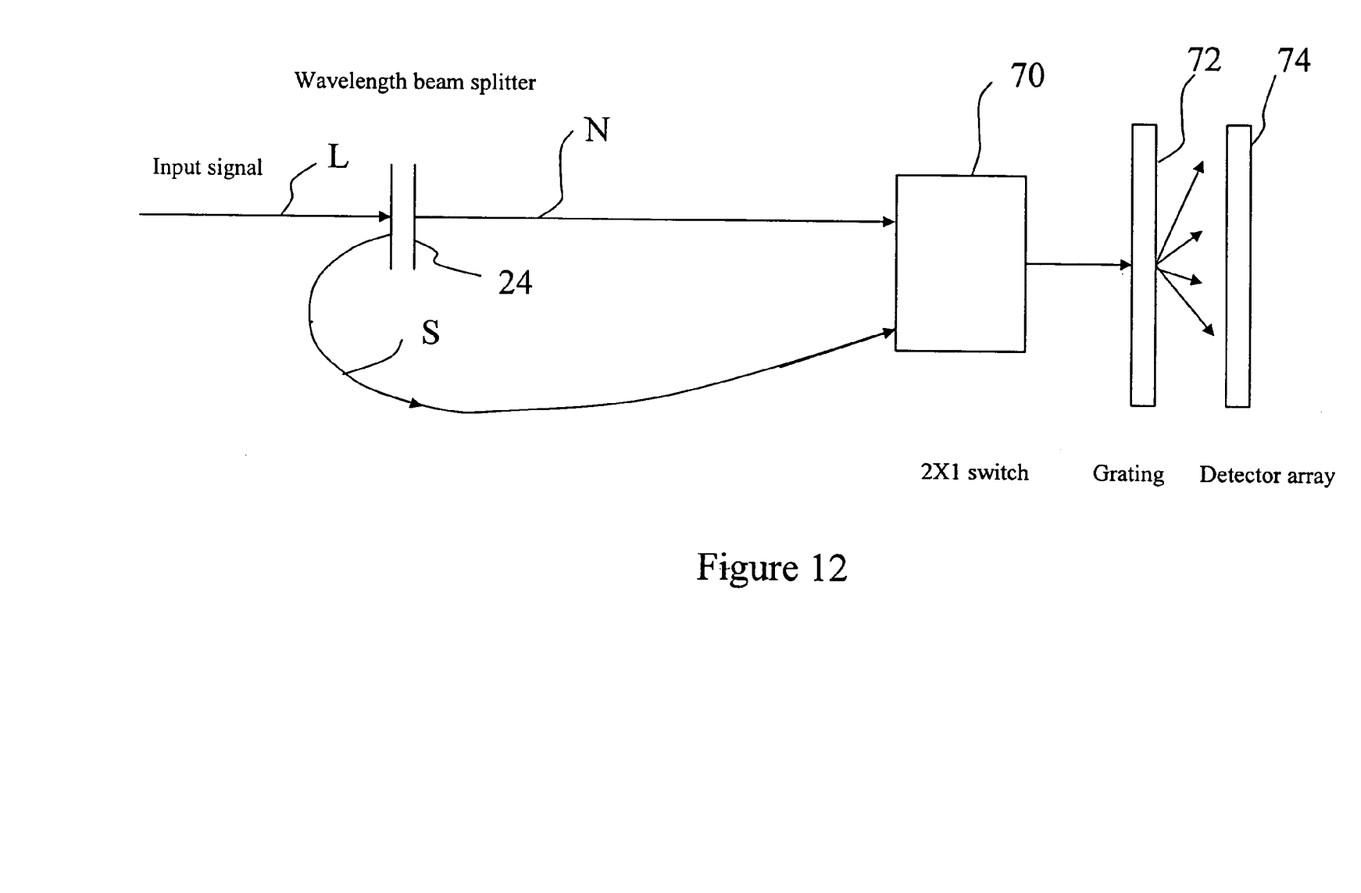
FIG. 12 is a schematic diagram of another embodiment wherein the wavelength beam splitter of the invention is combined with a 2×1 switch to alternately pass the signal and the noise channels of a multi-channel input beam to a conventional grating/detector assembly.

In an alternative embodiment of the invention, the input light is not scanned by a tunable filter to sequentially isolate channels. Instead, as illustrated in FIG. 12, the multi-channel input light L is fed directly to the wavelength beam splitter 24 to separate the signal channels S from the noise channels N. Both channels are then fed to a 2×1 switch 70 operable to alternatively (and necessarily also alternately) pass either the signal beam S or the noise beam N. Each beam is then processed in conventional manner by dispersing it through a grating 72 and measuring the intensity spectrum with a large pixelated detector 74.

Figure 13:
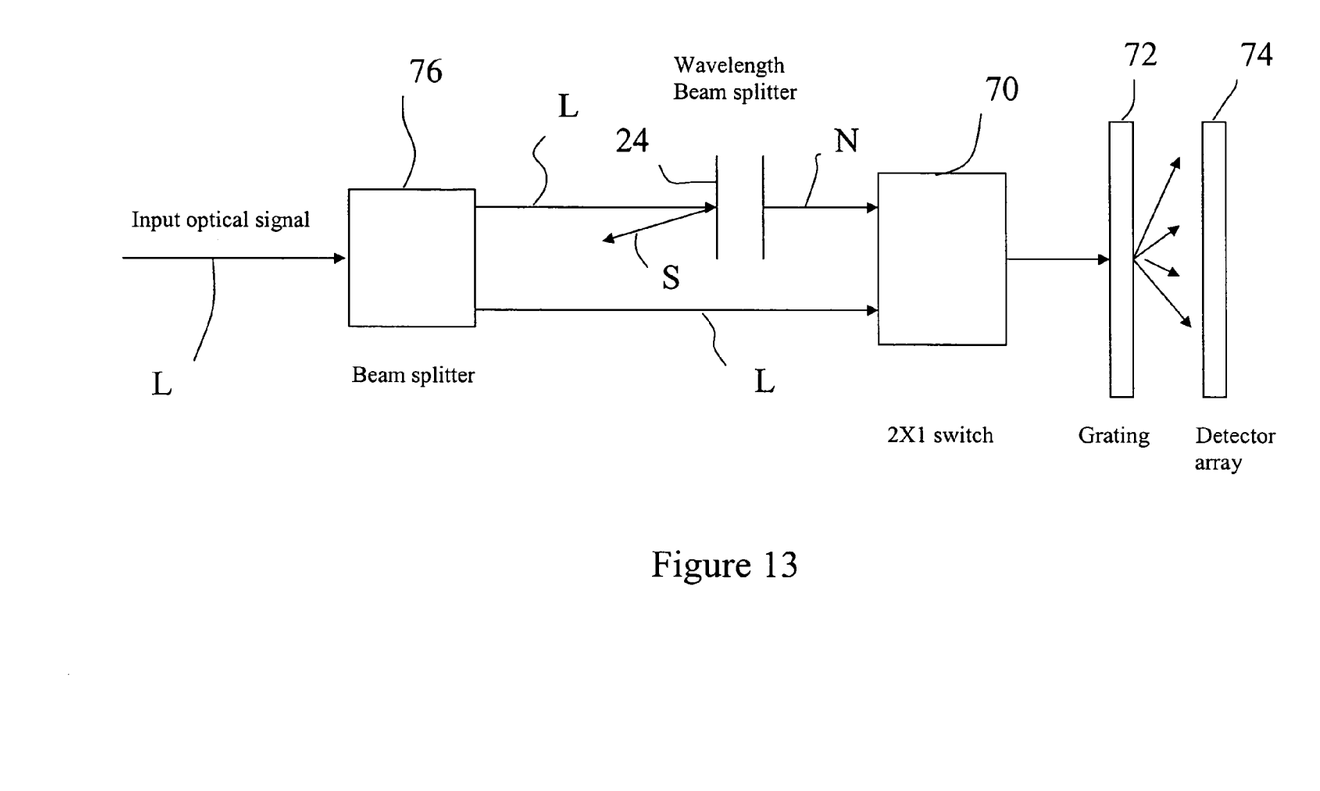
FIG. 13 is a schematic diagram of still another embodiment wherein a beam splitter is combined with the wavelength beam splitter of the invention and a 2×1 switch to alternately pass the input beam or the noise channels only of a multi-channel input beam to a conventional grating/detector assembly.

In an alternative embodiment illustrated in FIG. 13, the input light L is first split by a beam splitter. One portion of the light L, which contains both the signal and noise spectra S,N, is fed directly to the switch 70. The other portion is processed by the wavelength beam splitter 24 of the invention to separate the noise channels from the signal channels and feed them to the switch 70. The signal channels S reflected by the WBS 24 are not used.

Figure 14:
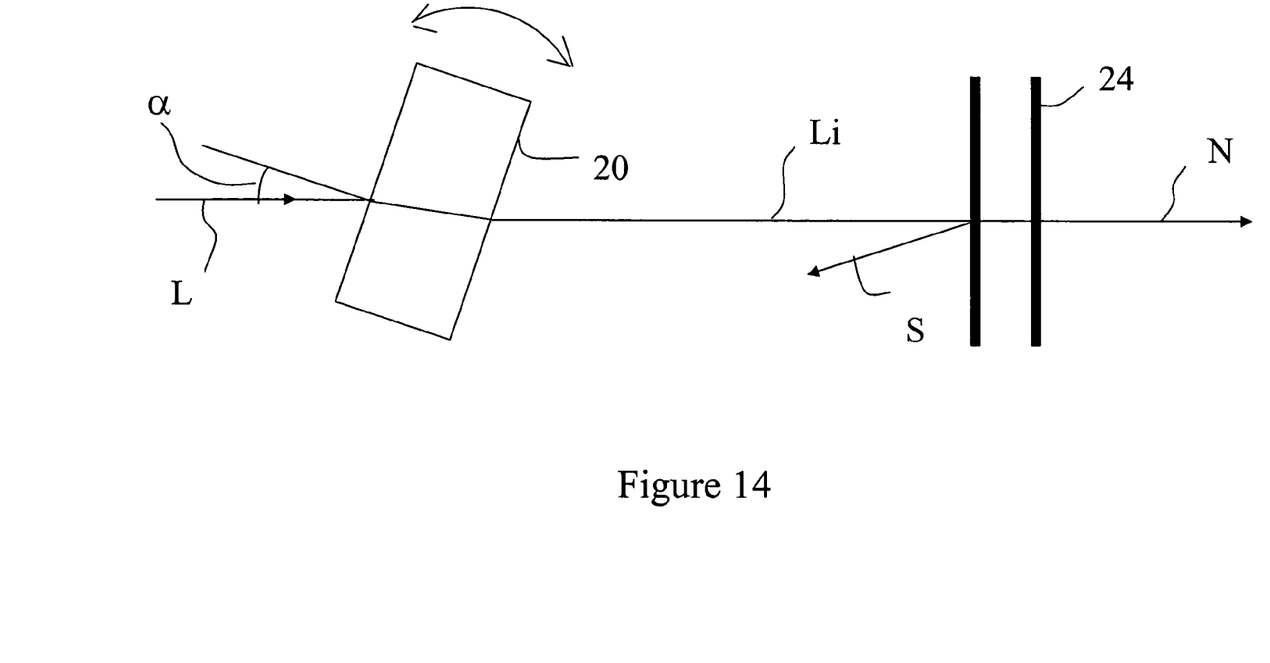
FIG. 14 illustrates the preferred embodiment of a tunable filter for the invention.

Finally, inasmuch as a tunable filter is in essence a spectrometer, its wavelength accuracy is very important. For an angle-tuning-based filter, as illustrated in FIG. 14, the relation between the angle of incidence $\alpha$ of an input light L of known wavelength and the wavelength of the transmitted beam Li is precisely defined. Therefore, if the wavelength of the light transmitted through the filter is known, the angle of incidence, and therefore also the angle of the tunable filter with respect to a given reference, are also known. A typical resolution of 20 pm requires an angular accuracy of 20 arc-second. However, controlling a tunable filter's angle with an accuracy of 20 arc-second is very difficult, especially when the filter keeps moving during tuning. (For a cavity-based filter, a similar challenge is present because the relation between the length of the cavity and the wavelength is also fixed but the cavity length is difficult to control.) On the other hand, if transmitted light of a known wavelength is detected at the output of the filter, the corresponding angular position of the filter is also known.

Therefore, according to yet another aspect of the invention, the wavelength of the light transmitted through the filter and the wavefront beam splitter is used advantageously as a calibration reference to measure the accuracy of the signal wavelength in each ITU-grid channel. When light of multiple wavelengths is transmitted sequentially, multiple corresponding angular positions of the filter are successively obtained as the filter rotates. Accordingly, these known positions and the corresponding wavelengths can be used to determine the center wavelengths of corresponding signals and obtain wavelength errors (channel drift) with respect to the ITU grid. In the preferred embodiment of FIG. 14, the wavelength beam splitter 24 is used to produce a noise output N with local minima that coincide with the target center wavelengths of the ITU grid, as illustrated in FIG. 9. As is well understood in the art, these minima are defined by the free-spectrum range of the cavity of the wavelength beam splitter. Therefore, the relationship between the occurrence of each minimum and the angular position of the tunable filter provides a reference against which the center frequency of the corresponding channel signal may be checked to continuously monitor the system for channel drift.

Figure 15:
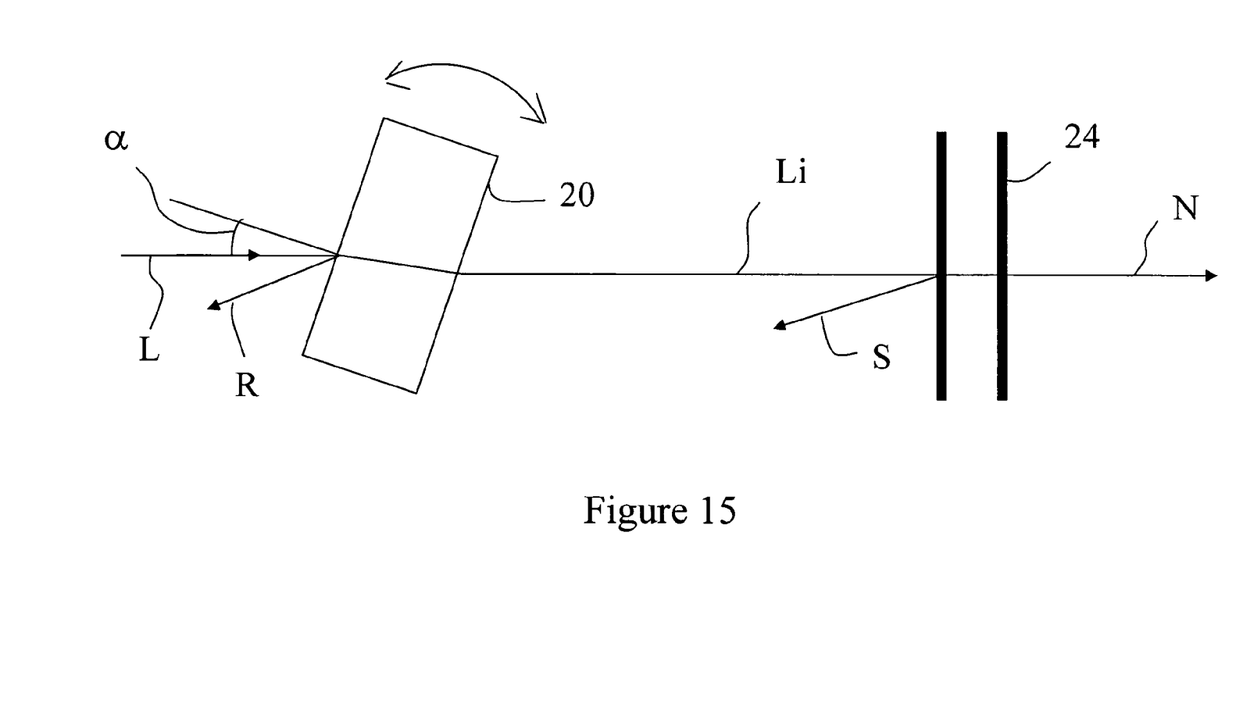
FIG. 15 illustrates another embodiment of a tunable filter wherein a retro-reflected beam of the filter is used as an initial reference for calibration of the angle of rotation of the filter.
Figure 16:
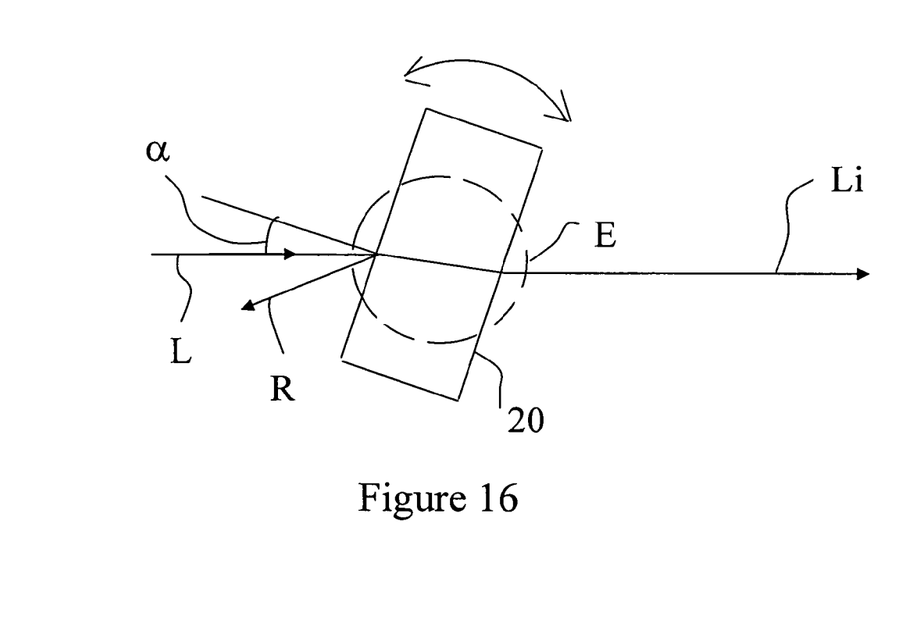
FIG. 16 illustrates an embodiment wherein the retro-reflected beam is combined with an encoder to provide the angular position information required to track wavelength error according to the invention.

FIG. 15 shows an embodiment wherein the retro-reflection light R from the tunable filter 20 is used to generate an initial position of the tuner (and, equivalently, the angle of incidence of the input light L). When combined with an encoder E, as shown in FIG. 16, the initial position (and angle of incidence) provided by the reflected beam R may be used to track the angular position of the tunable filter 20 (and the angle of incidence of the input beam L) even without the information available from the noise minima recorded at the output of the wavelength beam splitter. The two approaches could be used together to further refine the precision of the encoder.

While the invention has been described using an optical cavity to provide the required wavelength beam splitting functionality, it is recognized that other optical devices may be used. For example, a Michelson interferometer, properly designed to provide separate outputs characterized by spectra that match the period and the center-wavelength alignment of the multi-channel communication system of interest, could be used with the same advantageous results. Similarly, the invention of FIG. 2 could be practiced as well, but more expensively, by feeding the input light first to the wavelength beam splitter and then by having a separate tunable filter associated with each output beam. Also, while it is preferred to have a tunable filter that isolates a single channel at a time, it is clear that the advantages of the invention would still be enjoyed, at least in part, by isolating and processing more than one channel at a time. All of these variations are considered to be part of the invention.

Thus, while the invention has been shown and described in what is believed to be the most practical and preferred embodiments, it is recognized that appropriate deviations can be made within the scope of the disclosure. Therefore, the invention is not to be limited to the disclosed details, but is intended to embrace all equivalent structures and methods.

The invention claimed is:

1. An optical performance monitoring device for a multi-channel communication system with a predetermined channel spacing, comprising:
    a wavelength beam splitter characterized by a periodic spectral response with a period substantially equal to the channel spacing of the multi-channel communication system;
    detector means for sensing and measuring a signal beam and a noise beam produced by the wavelength beam splitter; and
    processing means for calculating a signal-to-noise ratio based on information derived from said detector means;
    wherein said wavelength beam splitter includes an optical cavity having an optical path length that produces a free-spectral range substantially equal to the channel spacing of the multi-channel communication system.

2. The device of claim 1, further including a tunable filter to isolate a channel for processing out of said multi-channel communication system.

3. The device of claim 2, wherein said tunable filter produces a retro-reflected beam, and said beam is utilized as a measure of an initial angle of incidence of an input beam for an initial calibration of an angle of rotation of the tunable filter.

4. The device of claim 3, wherein said tunable filter further includes an encoder to measure said angle of rotation of the tunable filter.

5. The device of claim 1, further including additional processing means for calculating a center frequency of a channel in said signal beam.

6. The device of claim 1, further comprising a switch for alternate processing of said signal beam and noise beam produced by the wavelength beam splitter prior to feeding said signal and noise beams to the detector means.

7. The device of claim 6, further comprising a grating to disperse said signal beam and noise beam produced by the wavelength beam splitter prior to feeding said signal and noise beams to the detector means.

8. The device of claim 1, further comprising a beam splitter and a switch, said beam splitter for splitting an input beam into a portion thereof directed to said wavelength beam splitter and another portion thereof directed to the switch, and the switch for alternately processing said other portion of the input beam and said noise beam produced by the wavelength beam splitter prior to feeding said other portion of the input beam and said noise beam to the detector means.

9. The device of claim 8, further comprising a grating to disperse said other portion of the input beam and said noise beam produced by the wavelength beam splitter prior to feeding said other portion of the input beam and said noise beam to the detector means.

10. An optical performance monitoring device for a multi-channel communication system with a predetermined channel spacing, comprising:
    a wavelength beam splitter characterized by a periodic spectral response with a period substantially equal to the channel spacing of the multi-channel communication system;
    detector means for sensing and measuring a signal beam and a noise beam produced by the wavelength beam splitter;
    processing means for calculating a signal-to-noise ratio based on information derived from said detector means; and
    a switch for alternate processing of said signal beam and noise beam produced by the wavelength beam splitter prior to feeding said beams to the detector means.

11. The device of claim 10, further including a tunable filter to isolate a channel for processing out of said multi-channel communication system.

12. The device of claim 10, further including additional processing means for calculating a center frequency of a channel in said signal beam.

13. The device of claim 10, further comprising a grating to disperse said signal beam and noise beam produced by the wavelength beam splitter prior to feeding said signal and noise beams to the detector means.

14. An optical performance monitoring device for a multi-channel communication system with a predetermined channel spacing, comprising:
    a wavelength beam splitter characterized by a periodic spectral response with a period substantially equal to the channel spacing of the multi-channel communication system;
    detector means for sensing and measuring a signal beam and a noise beam produced by the wavelength beam splitter;
    processing means for calculating a signal-to-noise ratio based on information derived from said detector means; and
    a beam splitter and a switch, said beam splitter for splitting an input beam into a portion thereof directed to said wavelength beam splitter and another portion thereof directed to the switch, and the switch for alternately processing said other portion of the input beam and said noise beam produced by the wavelength beam splitter prior to feeding said other portion of the input beam and said noise beam to the detector means.

15. The device of claim 14, further comprising a grating to disperse said other portion of the input beam and said noise beam produced by the wavelength beam splitter prior to feeding said other portion of the input beam and said noise beam to the detector means.

16. An optical performance monitoring device for a multi-channel communication system with a predetermined channel spacing, comprising:
- a tunable filter to isolate a channel for processing out of said multi-channel communication system, wherein said tunable filter produces a retro-reflected beam, and said beam is utilized as a measure of an initial angle of incidence of an input beam for an initial calibration of an angle of rotation of the tunable filter; and
- an encoder to measure said angle of rotation of the tunable filter.

17. An optical performance monitoring device for a multi-channel communication system with a predetermined channel spacing, comprising:
- a wavelength beam splitter characterized by a periodic spectral response with a period substantially equal to the channel spacing of the multi-channel communication system;
- detector means for sensing and measuring a signal beam and a noise beam produced by the wavelength beam splitter; and
- processing means for calculating a wavelength error based on information derived from said signal beam.

18. A method of monitoring optical performance in a multi-channel communication system with a predetermined channel spacing, comprising the following steps:
- providing a wavelength beam splitter characterized by a periodic spectral response with a period substantially equal to the channel spacing of the multi-channel communication system;
- splitting an input beam into a signal beam and a noise beam using said wavelength beam splitter;
- sensing and measuring said signal beam and said noise beam produced by the wavelength beam splitter; and
- calculating a signal-to-noise ratio based on information derived from measuring said signal and noise beams.

19. The method of claim 18, further including the step of filtering said input beam to isolate a channel for processing out of said multi-channel communication system.

20. The method of claim 18, further including the steps of splitting said input beam, feeding a portion of the input beam to a switch and another portion of the input beam to the wavelength beam splitter to produce a signal beam and a noise beam, feeding the noise beam to the switch, and alternatively transmitting said other portion of the input beam or said noise beam produced by the wavelength beam splitter for the sensing and measuring step.

21. The method of claim 20, further comprising the step of dispersing said other portion of the input beam and said noise beam produced by the wavelength beam splitter prior to the sensing and measuring step.

22. A method of monitoring optical performance in a multi-channel communication system with a predetermined channel spacing, comprising the following steps:
- providing a wavelength beam splitter characterized by a periodic spectral response with a period substantially equal to the channel spacing of the multi-channel communication system;
- splitting an input beam into a signal beam and a noise beam using said wavelength beam splitter;
- sensing and measuring said signal beam and said noise beam produced by the wavelength beam splitter;
- calculating a signal-to-noise ratio based on information derived from measuring said signal and noise beams; and
- alternatively transmitting said signal beam or said noise beam produced by the splitting step for the sensing and measuring step.

23. The method of claim 22, further comprising the step of dispersing said signal beam and noise beam produced by the splitting step prior to the sensing and measuring step.

24. A method for monitoring optical performance of a multi-channel communication system with a predetermined channel spacing, comprising the steps of:
- splitting an input beam into a signal beam and a noise beam using a wavelength beam splitter characterized by a periodic spectral response with a period substantially equal to the channel spacing of the multi-channel communication system;
- detecting and measuring said signal beam and noise beam produced by the wavelength beam splitter; and
- calculating a wavelength error based on information derived from said signal beam.

25. A method for monitoring optical performance of a multi-channel communication system with a predetermined channel spacing, comprising the steps of:
- isolating for processing a channel out of said multi-channel communication system using a tunable filter that produces a retro-reflected beam;
- utilizing said beam as a measure of an initial angle of incidence of an input beam for an initial calibration of an angle of rotation of the tunable filter;
- using an encoder to measure said angle of rotation of the tunable filter; and
- calculating a wavelength error based on information about said angle of rotation provided by said encoder.

* * * * *